US009579937B2

(12) United States Patent
Hennig

(10) Patent No.: US 9,579,937 B2
(45) Date of Patent: Feb. 28, 2017

(54) TIRE MANAGEMENT SYSTEM

(75) Inventor: Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 469 days.

(21) Appl. No.: 13/880,413

(22) PCT Filed: Nov. 21, 2011

(86) PCT No.: PCT/US2011/061728
§ 371 (c)(1),
(2), (4) Date: May 2, 2013

(87) PCT Pub. No.: WO2012/068583
PCT Pub. Date: May 24, 2012

(65) Prior Publication Data
US 2013/0306192 A1 Nov. 21, 2013

Related U.S. Application Data

(60) Provisional application No. 61/415,733, filed on Nov. 19, 2010.

(51) Int. Cl.
B60C 23/00 (2006.01)
B60C 23/02 (2006.01)
(52) U.S. Cl.
CPC ............ B60C 23/02 (2013.01); B60C 23/003 (2013.01)

(58) Field of Classification Search
CPC ..... B60C 23/00; B60C 23/001; B60C 23/002; B60C 23/003; B60C 23/007;
(Continued)

(56) References Cited

U.S. PATENT DOCUMENTS 3,102,573 A 9/1963 Van Winsen
4,065,186 A 12/1977 Walther
(Continued)

FOREIGN PATENT DOCUMENTS

WO WO2012068583 5/2012

OTHER PUBLICATIONS

International Search Report and Written Opinion issued in corresponding PCT App. Serial No. PCT/US2011/061728 dated Mar. 19, 2012 (10 pages).
(Continued)

Primary Examiner — Jason Bellinger
(74) Attorney, Agent, or Firm — The Pizarro Firm

(57) ABSTRACT

A tire management system for a truck or trailer having an axle having a first tire mounted thereto, the system having an air pressure supply connected to the tire so as to allow sealed communication of pressurized air between the air pressure supply and the first tire, and a first pilot-operated check valve in sealed fluid communication with the air pressure supply and with the first tire, the first pilot-operated check valve being configured to allow air to flow only from the air pressure supply to the first tire when a pilot of the first pilot check valve is not activated, and to allow air to flow between the first tire and the air pressure supply when the pilot of the first pilot-operated check valve is activated.

17 Claims, 5 Drawing Sheets

(58) Field of Classification Search
CPC ..... B60C 23/008; B60C 23/009; B60C 23/02; B60C 23/04; B60C 23/0408
USPC .................................................. 152/415–417
See application file for complete search history.

(56) References Cited

U.S. PATENT DOCUMENTS

| | | | |
|---|---|---|---|
| 4,117,281 A | 9/1978 | Leimbach | |
| 4,498,515 A | 2/1985 | Holtzhauser et al. | |
| 4,582,108 A | 4/1986 | Markow et al. | |
| 4,619,303 A | 10/1986 | Bryan et al. | |
| 4,640,331 A | 2/1987 | Braun et al. | |
| 4,705,090 A * | 11/1987 | Bartos | B60C 23/003 137/224 |
| 4,724,879 A | 2/1988 | Schultz et al. | |
| 4,763,709 A * | 8/1988 | Scholer | B60C 23/001 152/416 |
| 4,825,925 A | 5/1989 | Schultz | |
| 4,860,579 A | 8/1989 | Beverly | |
| 4,898,216 A | 2/1990 | Schultz et al. | |
| 4,917,163 A | 4/1990 | Schultz | |
| 4,924,926 A | 5/1990 | Schultz et al. | |
| 5,094,263 A | 3/1992 | Hurrell, II et al. | |
| 5,180,456 A | 1/1993 | Schultz et al. | |
| 5,249,609 A | 10/1993 | Walker et al. | |
| 5,253,687 A | 10/1993 | Beverly et al. | |
| 5,263,524 A | 11/1993 | Boardman | |
| 5,273,064 A | 12/1993 | Beverly et al. | |
| 5,313,995 A | 5/1994 | Schultz | |
| 5,409,045 A | 4/1995 | Walker et al. | |
| 5,516,379 A | 5/1996 | Schultz | |
| 6,145,559 A | 11/2000 | Ingram, II | |
| 6,865,930 B1 | 3/2005 | Claussen et al. | |
| 6,894,607 B1 | 5/2005 | Claussen et al. | |
| 7,051,585 B2 | 5/2006 | Claussen et al. | |
| 7,197,422 B2 | 3/2007 | Gaunt et al. | |
| 7,273,082 B2 | 9/2007 | White et al. | |
| 7,416,005 B2 | 8/2008 | Hennig et al. | |
| 7,437,920 B2 | 10/2008 | Beverly et al. | |
| 2005/0194079 A1 | 9/2005 | Hennig | |
| 2007/0214963 A1 | 9/2007 | Hoffman | |
| 2009/0032158 A1 | 2/2009 | Rudolf et al. | |
| 2012/0059546 A1 | 3/2012 | Wilson et al. | |
| 2013/0068361 A1 | 3/2013 | Flory et al. | |

OTHER PUBLICATIONS

International Preliminary Report on Patentability issued in corresponding PCT App. Serial No. PCT/US2011/061728 dated Mar. 19, 2012 (8 pages).

* cited by examiner

TIRE MANAGEMENT SYSTEM

CROSS-REFERENCE TO RELATED APPLICATION

This application is a 371 national stage application of PCT/US2011/061728, filed on Nov. 21, 2011, which claims priority to U.S. Patent Application No. 61/415,733, entitled "Wide-Based Tire Management System," filed Nov. 19, 2010, which is entirely incorporated herein by reference.

FIELD

The disclosed system and method generally relate to tire pressure maintenance.

BACKGROUND

Wide-based tires and other types of tires may experience variations in tire pressure as the vehicle on which the tires are mounted changes altitude, moves and parks, or is exposed to sunlight and darkness. There exists a need for a tire management system that can adjust the tire pressure in a wide-based tire or other type of tire to maintain a relatively constant tire pressure.

SUMMARY

A tire management system for a truck or trailer comprising an axle having a first tire mounted thereto, the system comprising an air pressure supply connected to the tire so as to allow sealed communication of pressurized air between the air pressure supply and the first tire, and a first pilot-operated check valve in sealed fluid communication with the air pressure supply and with the first tire, the first pilot-operated check valve being configured to allow air to flow only from the air pressure supply to the first tire when a pilot of the first pilot check valve is not activated, and to allow air to flow between the first tire and the air pressure supply when the pilot of the first pilot-operated check valve is activated.

A method of managing tire pressure for a truck or trailer comprising an axle having a tire mounted thereto, the method comprising connecting an air pressure supply to the tire so as to allow sealed communication of pressurized air between the air pressure supply and the tire, and connecting a pilot-operated check valve to the air pressure supply and to the tire so as to allow sealed fluid communication with the air pressure supply and with the tire, the pilot-operated check valve being configured to allow air to flow only from the air pressure supply to the tire when a pilot of the pilot check valve is not activated, and to allow air to flow between the tire and the air pressure supply when the pilot of the pilot-operated check valve is activated.

A tire management system for a truck or trailer comprising an axle having a first tire mounted thereto, the system comprising pressure means for supplying pressurized air to the tire, and flow means in sealed fluid communication with the pressure means and with the tire for allowing air to flow only from the pressure means to the tire when the flow means is not activated, and for allowing air to flow between the tire and the pressure means when the flow means is activated.

DETAILED DESCRIPTION

Figure 1:
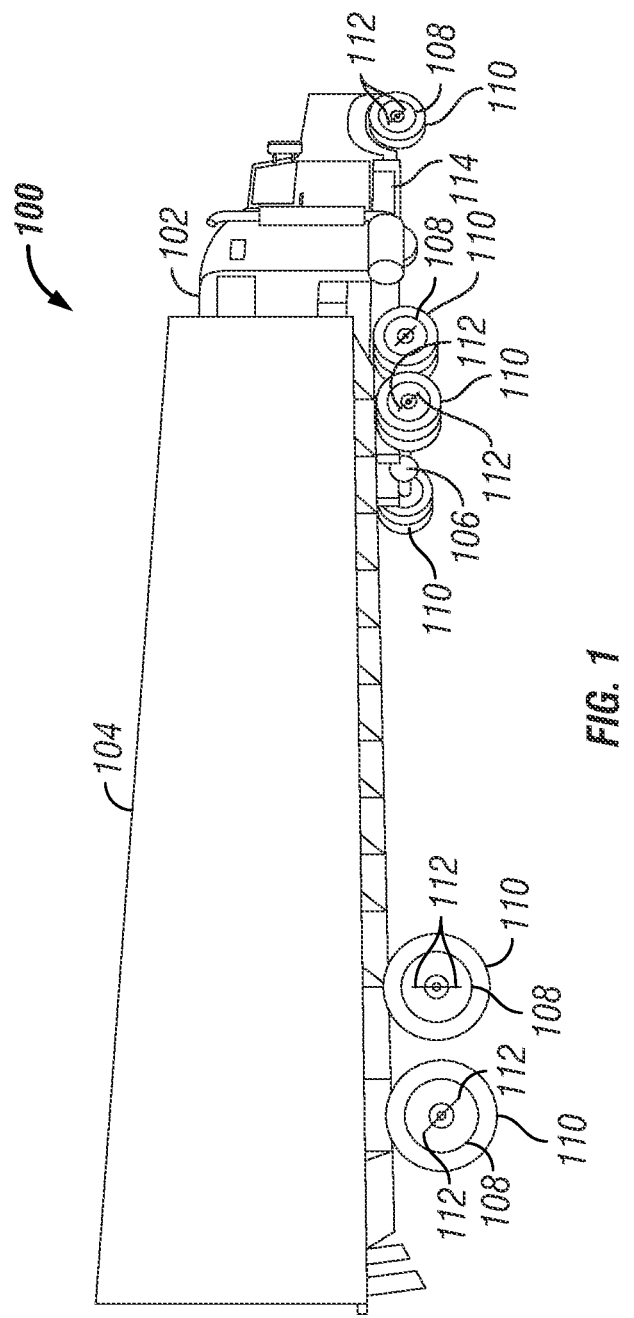
FIG. 1 illustrates one embodiment of a vehicle having an automatic tire inflation system.

As may be seen in FIG. 1, a vehicle 100 may comprise a truck 102 and a trailer 104. The truck 102 may include one or more drive axles 106 as part of the vehicle's powertrain. The truck 102 may further include a steer axle (not shown in detail) having pivotable spindles that may provide steering capability for the vehicle 100. The trailer 104 may include one or more fixed axles (not shown). Each axle may have one or more wheels 108 mounted thereto. A pneumatic tire 110 may be mounted to each wheel 108. Each axle may have one tire 110 on each end of the axle, such as a wide-base tire 210 as shown in FIG. 2, or may have two or more tires attached at each end of the axle, such as the two tires 110 on each end of the drive axle 106 shown in FIG. 1.

The vehicle 100 may be provided with an automatic tire inflation system (ATIS) that uses pressurized air from the vehicle's air brake system or some other source of pressurized air to maintain the tires 110 at a desired air pressure, such as the ATIS manufactured variously by Pressure Systems International, Inc. (PSI), Hendrickson, Airgo, Vigia and others. The automatic tire inflation system may be used to control air pressure in one or more of the tires 110 mounted to the steer axle (not shown), drive axle 106 or trailer axles (not shown). As shown in FIG. 1, the automatic tire inflation system may include one or more air hoses 112 in fluid communication with each tire 110 for communicating air from an air pressure source 114 to and from one or more of the tires 110. Such systems may supply pressurized air, via a rotary union mounted on or in the wheel-end assembly, to the tires 110 so as to pressurize the tires 110. Suitable rotary unions, and other suitable tire inflation system components, may include those disclosed in U.S. Pat. Nos. 6,698,482; 6,105,645, 6,325,124, 6,325,123, 7,302,979, 6,269,691, 5,769,979, 6,668,888, 7,185,688, 7,273,082, 6,145,559, 7,270,365, 6,425,427, 7,963,159, and U.S. Pat. Pub. No 2009/0266460, the disclosures of which are incorporated herein by reference. Such systems may route air through hoses positioned external to the vehicle (such as Vigia's system), or route air through a sealed or unsealed axle (such as PSI's system). Such systems may be used to inflate trailer tires 110, and/or tires 110 mounted to the steer axles or drive axles 106 of a heavy truck.

Figure 2:
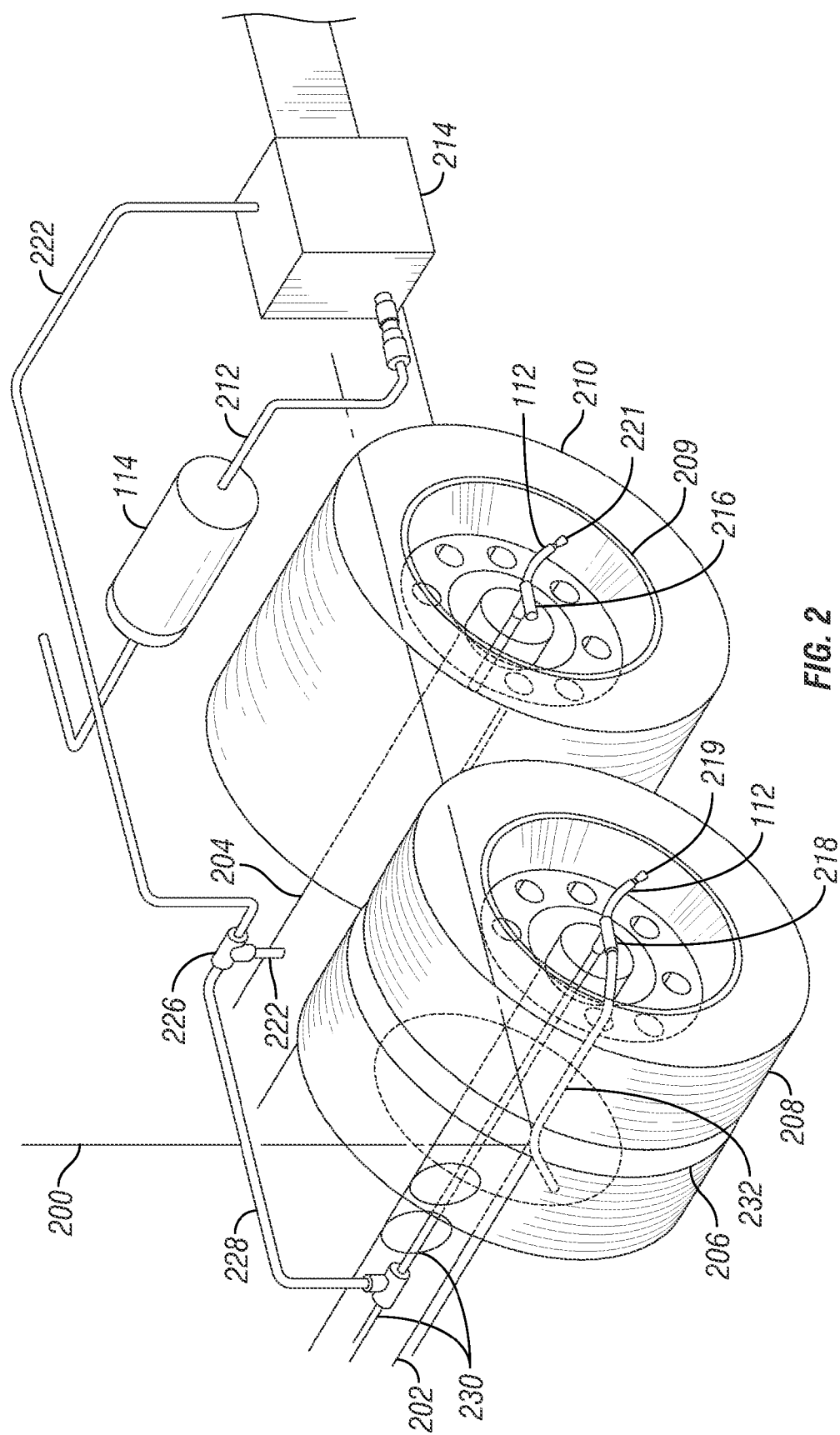
FIG. 2 illustrates an exemplary automatic tire inflation system.

FIG. 2 illustrates in more detail multiple embodiments of an automatic tire inflation system for trailer tires. A trailer 200 may include two axles 202 and 204. Some trailers may have dual tires 206 and 208 mounted at each end of the axles 202 and 204, as may be seen with respect to axle 202. Other trailers may have one wide-base tire 210 mounted at each end of the axles 202 and 204, as may be seen with respect to axle 204. The automatic tire inflation system may generally include a pressure regulator 214 and one or more rotary air connections or rotary unions 216 and 218 mounted in or near the axle ends. The pressure regulator 214 may receive pressurized air from an air pressure source 114 through a conduit 212. The air pressure source 114 may comprise, for example, a vehicle air brake system air supply, or a step-up or booster pump. The pressure regulator 214 may control or reduce the air pressure from the air pressure source 114 to an air pressure level suitable for inflating the tires 206, 208, 210, such as, for example, at 110 psi. Pressurized air may flow from the pressure regulator 214 through conduits 222 and 228 to the axles 202 and 204.

The axles 202 and 204 may be wholly or partially solid or hollow, and may be configured in a variety of ways. For illustration purposes only, axles 202 and 204 are shown as hollow. For example, in some embodiments, an axle may comprise a solid beam having a spindle attached to each end (not shown). The axle spindles may be configured to allow mounting of wheel bearings upon which a hub may be rotatably mounted (not shown). In other embodiments, an axle may comprise a hollow tube having a spindle attached to each end. The spindles may be hollow, resulting in a hollow axle that is open at each end. Alternatively, the spindles may be wholly or partially solid, resulting in a hollow axle that is closed at each end.

If the axle is open at the end, the axle may be sealed so as to allow the hollow axle to hold pressurized air and to support air conduits or rotary air connections (or components thereof), for example, with a plug or cap such as is disclosed in one of U.S. Pat. Nos. 5,584,949, 5,769,979, 6,131,631, 6,394,556, 6,892,778, and 6,938,658. The open end may also be provided with a plug or cap that may serve more to support air conduits or rotary air connections (or components thereof) than to seal the hollow axle to hold pressurized air, such as a plug or cap disclosed in one of U.S. Pat. Nos. 6,325,124 and 7,273,082.

In the embodiments of FIG. 2, axles 202 and 204 may be hollow sealed axles. In one embodiment, axle 204 may be hollow and may be sealed to serve as part of the conduit 222 for pressurized air. The air conduit 222 may be sealingly connected to the axle 204 to allow pressurized air to flow from the pressure regulator 214 to the axle 204. The pressurized air may flow through the axle 204 to a rotary air connection 216 mounted in or near the spindle end as described in more detail below. An air hose 112 may connect to the rotary air connection 216 to a valve stem 221 of the wheel 209 to which the tire 210 is mounted, thus allowing pressurized air to flow to and/or from the tire 210.

In some embodiments, the air conduit 222 may be sealingly connected to a tee 226 to allow pressurized air to flow both to axle 202 and to axle 204. An air conduit 228 may, for example, allow pressurized air to flow from the tee 226 to a conduit 230 disposed in axle 202. Axle 202 may carry an air conduit 230 to communicate pressurized air to rotary air connection 218, such as is disclosed in U.S. Pat. Nos. 6,325,124 and 7,273,082. Air hoses 112, 232 may connect the rotary air connection 218 to the valve stems 219 of the wheels to which tires 206 and 208 are mounted, thus allowing pressurized air to flow to and/or from the tires 206 and 208. In other embodiments, if the axle 202 is solid, then a channel may be bored in axle 202 to permit positioning of all or part of conduit 230 inside the axle 202.

The tire pressure in a wide-base tire may be more affected by temperature, barometric pressure and altitude than a typical-width tire. Tire pressure may vary according to a number of factors, such as load, altitude and temperature. A tire's pressure may be higher when bearing heavier loads. For example, a stationary tire's temperature may rise as night turns to day and the tire is exposed to sunlight, thus raising the tire pressure. Likewise, a tire's temperature may rise during use, thus raising tire pressure. Or, a tire's pressure may rise as atmospheric conditions change, such as when low-pressure weather systems form. A tire's pressure may also rise when traveling from a lower altitude to a higher altitude. Thus, tire pressure may be greater than the automatic tire inflation system's target pressure, often many times throughout the day. Conversely, a tire's pressure may decrease when traveling from a higher altitude to a lower altitude, or as day turns to night, or as the tire 206, 208, 210 stops moving. When the tire pressure drops below the automatic tire inflation system's target pressure, then the automatic tire inflation system may pressurize the tire 206, 208, 210.

Figure 3:
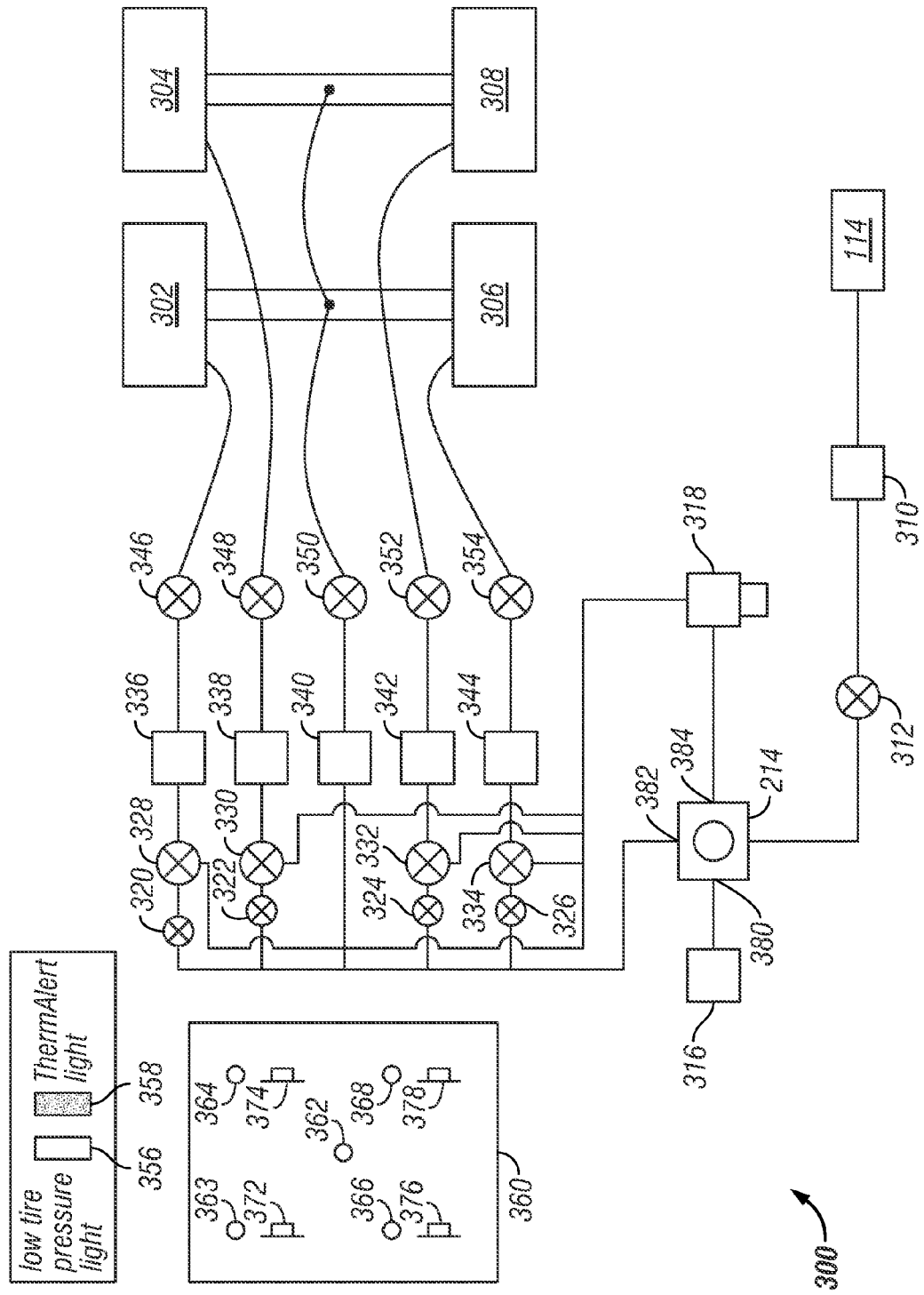
FIG. 3 illustrates a schematic diagram of one embodiment of a tire management system.

With reference to FIG. 3, the disclosed tire management system 300 may provide pressurized air to wide-base tires 302, 304, 306 and 308, and may allow the driver and maintenance personnel to detect not only abnormal tire pressures, but also readily determine which tire 302, 304, 306 and 308 is suffering abnormal pressure. A tire inflation system, such as those described and incorporated by reference above, may be used as part of the tire management system 300 to supply air to tires 302, 304, 306 and 308. In some embodiments, the tires 302, 304, 306 and 308 are wide-base tires mounted on the drive axles of a heavy truck, or on a trailer. As described above, heavy trucks and trailers have typically included two tires mounted to the end of each axle in a dual-tire configuration, i.e., each axle has mounted four tires. Increasingly, however, heavy trucks and trailers use a single, wide-base tire in place of dual tires, i.e., each axle has mounted two tires. Thus, a two-axle trailer may have only four wide-base tires 302, 304, 306 and 308 instead of eight tires of typical width. Wide-base tires 302, 304, 306 and 308 may include those manufactured by Michelin, such as the super-single X One tire. However, the system disclosed herein is equally suitable for dual-tire or multi-tire configurations. In such case, the tires symbolized by reference numbers 302, 304, 306 and 308 may each comprise a set of two or more tires.

An air pressure supply 114, such as that for a truck's air-brakes, may provide pressurized air through a conduit to a regulator 214. An air filter 310 may be provided to clean the air passing to the regulator 214 and a shut-off valve 312 may be provided to selectively permit or prevent fluid communication between the air supply 114 and the regulator 214. The regulator 214 may be of any suitable type, such as model LR-1/8-D-0-mini-NPT manufactured by Festo, and may be set to pass through air at a pressure of, e.g., 100 psi or any other pressure suitable for maintaining a desired tire inflation pressure. The regulator 214 may pass air to one or more outlet ports 380, 382, 384.

A pressure switch 316 may be connected to a first outlet port 380 so as to detect the pressure of the air at the outlet ports 380 of the regulator 214. If the air at the outlet port 380 is below predetermined pressure, the pressure switch 316 may not send a signal to the indicator light 362. If the air at the outlet port 380 is at or above a predetermined pressure, the pressure switch 316 may generate a signal used to turn on or off a light 362 in the control panel 360. The light 362 may be a "system normal" light 362 in, e.g., green, which indicates to the driver that the air pressure at port 380 is at or above the predetermined pressure. Alternatively, the light 362 may de-illuminate a red light and illuminate a green light when the light 362 receives a signal from the switch 316. The pressure switch 316 may also send a signal to a microprocessor or other mechanism for signal processing, e.g., A/D conversion and encoding. The signal may be sent via wire or by wireless transmission. The signal may also be sent to a remote dispatch location for fleet management by, e.g., satellite, cellular or other mode of wireless transmission. Light 362 may be mounted in a vehicle cab or at the front of a trailer so that the driver can see the light reflected in the side-view mirror. The pressure switch 316 may, alternatively or also, send the signal to cause illumination of other lights in the vehicle cab or at other locations on the vehicle. The air pressure sensed by the pressure switch 316 at the port 380 may indicate the pressure of air passed through the regulator 214. The air pressure sensed by the pressure switch 316 at the port 380 may also indicate the pressure at the tires 302, 304, 306, and 308 when the air pressure in the tires 302, 304, 306, and 308 is permitted to equalize between the tires 302, 304, 306, and 308.

A solenoid valve 318 may be connected to a third outlet port 384 of regulator 214 so as to receive pressurized air from the regulator 214. Preferably, the solenoid valve 318 in a de-activated position may prevent pressurized air from flowing from the regulator 214 through the solenoid valve 318. The solenoid valve 318 may be of any suitable type, such as model MFH-3-M5 manufactured by Festo (Hauppauge, N.Y., USA). The solenoid may be connected via wire or wireless link to the ignition control of the truck 102 such that when the truck ignition is turned on, the solenoid is activated. When the truck ignition is turned off, the solenoid is de-activated. When the solenoid valve 318 is activated, pressurized air may pass from the regulator 214 through the solenoid valve 318 to pilot check valves 328, 330, 332 and 334. Of course, the switches and relays may be electronically implemented via PCB and suitable software, and smaller or larger air valves may be used.

Solenoid valve 318 may also be pneumatically activated. In some embodiments, the solenoid valve 318 may be pneumatically activated and may be in fluid communication with an air pressure supply, such as, for example, air pressure source 114. In some embodiments, the air pressure source 114 may be the air pressure supply for the air brakes. In many air brake systems, the default position of the air brake is the engaged, braking position. The air brakes are held in the disengaged, non-braking position by air pressure from an air pressure supply. The air pressure may be released to apply the air brakes by pressing an air brake pressure release button in the cab of the truck 102. The air brake button may release, or "dump," the air pressure from the air brake system, thus allowing the air brakes to automatically move to an engaged, braking position. In some embodiments, the pneumatic solenoid valve 318 may be in fluid communication with the air in the air brake system and may be activated while air pressure is present in the air brake system. When the air pressure in the air brake system is "dumped," the pneumatic solenoid valve 318 may move to the de-activated position. Thus, the pneumatic solenoid valve 318 may be pneumatically operated by air pressurized from the air brake system. In other embodiments, the pneumatic solenoid valve 318 may be operated by pressurized air from other systems of the tractor or trailer, such as an air or booster pump.

The pilot-operated check valves 328, 330, 332 and 334 may be connected to a second outlet port 382 so as to communicate pressurized air with the regulator 214. The pilot check valves 328, 330, 332 and 334 may be of any suitable type, such as model HGL-1/8 NPT 34877 manufactured by Festo. The pilot check valves 328, 330, 332 and 334 may allow pressurized air to pass through in one direction only, i.e., from the regulator 214 toward the tires 302, 304, 306, 308, unless overridden by a pilot signal from the solenoid 318, as discussed below. If overridden, the check valve will open to allow air to pass in both directions.

The pilot check valves 328, 330, 332 and 334 may be connected to flow switches 336, 338, 340 and 342, respectively, which may in turn be connected to optional shut-off valves 346, 348, 352 and 354, respectively, so as to allow pressurized air to flow from the regulator 214 through the pilot check valves 328, 330, 332 and 334, through the flow switches 336, 338, 342 and 344, through the shut-off valves 346, 348, 352 and 354 (if open) to the tires 302, 304, 306 and 308.

When the solenoid valve 318 is not activated, air may flow through the pilot check valves 328, 330, 332 and 334 in only one direction, i.e., from the regulator 214 to the tires 302, 304, 306 and 308. When the solenoid valve 318 is activated, pressurized air may pass from the solenoid valve 318 to the pilot check valves 328, 330, 332 and 334, thus moving a pilot piston, or otherwise serving as or activating a pilot signal. For example, in some embodiments, the pilot check valves 328, 330, 332 and 334 may be electronic check valves and the pilot signal may be activated by an electronic pressure sensor. The pilot may override the checking function of the check valve, thus allowing air to flow in two directions, i.e., from the regulator 214 to the tires 302, 304, 306 and 308, as well as from the tires 302, 304, 306 and 308 to the regulator 214.

Likewise, when the solenoid valve 318 is not activated, and air only flows toward the tires 302, 304, 306 and 308 through the pilot check valves 328, 330, 332 and 334, each tire's pressure is independent of the other tires. If tire 302 suffers a leak, then air will not flow from tires 304, 306 and 308 to tire 302 and lose pressure. This feature may be helpful, for example, for preventing all tires from going flat if a vehicle is sitting at a truck stop overnight while one tire suffers a leak. The air may escape from leaky tire 302, but will not escape from tires 304, 306 and 308.

However, when the solenoid is activated, thus allowing air to flow back through the pilot check valve 328, 330, 332 and 334 to the regulator 214, each tire 302, 304, 306 and 308 is in fluid communication with the other tires. That allows all tires to maintain equal pressure. For example, if one side of a vehicle is facing the sun, the tires 302 and 304 on that side may be substantially warmer than the tires 306 and 308 on the shaded side of the vehicle, and may have correspondingly higher pressure. Allowing fluid communication between the tires 302, 304, 306 and 308 allows the tire pressures to equalize among the tires 302, 304, 306 and 308, thus preventing premature tire wear.

In another embodiment, the system 300 may not include a solenoid valve 318 if the pilot check valves 328, 330, 332 and 334 are electrically operated. The electrically-operated pilot check valves may default to a one-way flow position and move to a two-way flow position when activated. The electronically-operated pilot check valves may be connected with the vehicle ignition and may be electrically activated when then the ignition is turned and the vehicle is started. Or, if the pilot check valves 328, 330, 332 and 334 are pneumatically operated, then they could be activated by air from an air pressure supply, such as the air brake system of a truck, as described above. Thus, when the air brake system is pressurized, the pilot check valves 328, 330, 332 and 334 may be activated to allow two-way flow of air. If air is dumped from the air brake system, such as when the truck is parked, then the pilot check valves may be deactivated to allow only one-way air flow. Thus, the solenoid valve 318 may be optional.

If all tires 302, 304, 306 and 308 suffer from increased pressure, e.g., as a result of elevation change, then air may flow back through the pilot check valves 328, 330, 332 and 334 to the regulator 214 if the solenoid valve 318 is activated. In some embodiments, a pressure relief valve 320, 322, 324, 326 may be provided in connection with one or more of the pilot check valves 328, 330, 332 and 334, to allow excess pressure to escape from the tires 302, 304, 306, 308. In some embodiments, one or more pressure relief valves 320, 322, 324, 326 may be provided at any point between the air supply and the tire volume. In the embodiment of FIG. 3, for example, pressure relief valves 320, 322, 324, and 326 are positioned next to the pilot check valves, and may in other embodiments be positioned between the flow switches 336, 338, 342, 344 and shut off valves 346, 348, 352, 354. In some embodiments, the pressure relief valves 320, 322, 324, 326 are mechanically operated by releasing air when the air pressure against a spring-operated valve exceeds a predetermined pressure. In some embodiments, the pressure relief valves are electric solenoid valves. The electric solenoid valves may open when tire air pressure sensed by pressure transducers is above a predetermined pressure. The pressure transducer may generate a signal that may be used to open and close an electric solenoid valve. In some embodiments, the pressure may be released through an electric solenoid valve more quickly than a mechanically-operated pressure relief valve because an electric solenoid valve may be quickly moved to the open or closed position when a signal is received from the pressure transducer. In some embodiments, a mechanically-operated pressure relief valve may transition between an open and closed position more slowly as the pressure in the tires 302, 304, 306, and 308 gradually changes and exceeds the predetermined pressure.

In yet other embodiments, the regulator 214 may include a pressure relief valve that releases air when the pressure exceeds the pressure setting of the regulator 214, e.g., 100 psi. In some embodiments, the pressure relief valves 320, 322, 324, 326, such as pressure relief valves from FIG. 3, may be set so as to release air when the tire over-pressurization reaches a certain target above the desired pressure, such as +10 psi. Thus, if the target tire air pressure is set at 100 psi, the pressure relief valve 320, 322, 324, 326 may release air from the tire 110 if the tire pressure exceeds 110 psi. Alternatively, the pressure relief valves may release pressure if the air increases over the desired target pressure by any amount.

The flow switches 336, 338, 342 and 344 may be activated by air flow of a higher volumetric flow rate than a predetermined volumetric flow rate. Typically, a tire inflation system may typically add air a little bit at a time as needed or otherwise at a certain flow rate. However, if, for example, a tire is punctured or suffers a serious leak, much more air will flow to that tire in an effort to keep it inflated. If, for example, a leak in tire 302 was the result of a cut in the sidewall, then air may escape rapidly. More air would flow from the regulator 214, through the piloted check valve 328, through the flow switch 336, through the shut-off valve 346 to the tire 302. The higher volume of air flowing to leaky tire 302 may then activate flow switch 336 when flow switch 336 senses that the air flow exceeds a certain predetermined volume of air flow or air flow rate. When activated, flow switch 336 may send a signal, through a wired connection or wirelessly, to cause illumination of the "low tire pressure" indicator light 356 and may further cause illumination of the corresponding indicator light 363 in control panel 360. Optionally, the flow switch 336 may also activate the shut-off valve 346 to close, thus preventing further air from flowing to tire 302. Preferably, even if shut-off valve 346 prevents further air flow through the flow switch 336, thus de-activating the flow switch 336, the "low tire pressure" indicator light 356 will remain illuminated until a reset switch 372 corresponding to indicator light 363 is depressed or toggled. Thus, each tire 302, 304, 306, 308 may be in fluid communication with a flow switch 336, 338, 342, 344, respectively, that may activate the "low tire pressure" indicator light 356, and indicator lights 363, 364, 366, 368, respectively. Reset switches 372, 374, 376 and 378 may be used to reset the indicator lights, 363, 364, 366 and 368, respectively.

In some embodiments, a high-temperature warning system, such as the ThermAlert™ system 358 by PSI disclosed in U.S. Pat. Nos. 6,892,778 and 7,416,005, the disclosures of which are incorporated herein by reference, may be used in conjunction with a tire inflation system. Such a high temperature warning system may use pressurized air provided via regulator 214. In such embodiments, a flow switch 340 may be fluidly connected to the second outlet port 382 of the regulator 214, which flow switch 340 may be connected to a shut-off valve 350, which may be connected to a temperature-actuated pressure barrier, such as a plug with a eutectic alloy that will melt when reaching a temperature dangerous to continued safe operation of the wheel end. Air may thus flow from the regulator 214 through the flow switch 340 and shut-off valve 350 to the pressure barrier. If the pressure barrier senses high temperature, it may release pressurized air, thus activating the flow switch 340. When activated, the flow switch 340 may send a signal to illuminate an indicator light 358 positioned within the driver's view. The flow switch 340 may also send a signal to cause a different color of illumination of the "system normal" light 362, or cause de-illumination of the light, as the case may be, as described above. Having a separate flow switch 340 and indicator light 358 may allow a driver to determine whether low pressure results from a tire leak or from activation of the high-temperature warning system.

In some embodiments, signals from the various flow switches 336, 338, 340, 342, 344 and pressure switch 316 may be transmitted via wire or wirelessly to an indicator panel in the truck cab, or wirelessly to a fleet dispatcher's terminal. The indicator panel or terminal may provide visual or audible indicators of low tire pressure, and may further indicate which tire suffers from low pressure, or whether the high-temperature warning system has detected a high temperature at a wheel-end assembly. Wireless transmission may be by any suitable technology, such as by satellite, Bluetooth, cellular network, WiFi, WiMax, etc.

In some embodiments, the disclosed tire management system 300 may be used in connection with tire pressure monitoring systems, such as the wireless tire pressure monitoring system offered by Pressure Pro. For example, a tire pressure sensor (not shown) may be located at a wheel end, or may be located between the pilot check valve 328, 330, 332 and 334 and flow switch 336, 338, 342, 344 for tires 302, 304, 306, 308. The tire pressure sensor may detect tire pressure and send a signal indicating tire pressure to the driver or remote dispatch center. If, for example, the truck and trailer are parked with the ignition off and the pilot check valves 328, 330, 332 and 334 only allow one-way flow, the tire pressure sensors may still detect and transmit the tire pressure to the driver and/or remote dispatch center.

In some embodiments, the disclosed tire management system 300 may be used in connection with load monitoring systems generally found on air-ride trailers. A load sensor used in connection with a trailer air bag suspension, for example, may sense the trailer load. For example, the trailer may have air bags that cushion the load from road conditions, and also maintain the trailer bed level at a certain height. In some embodiments, a leveling valve may be attached to the trailer frame, and may have a lever arm that opens and closes the valve. If the trailer is empty, the air bag may have sufficient air pressure to keep the trailer bed at a certain height. If the trailer is loaded, and the trailer bed lowers under the weight, the lever arm may contact a suspension component, thus opening the valve and allowing air to flow into the air bags. As the pressure increases in the air bags, the trailer rises until the lever loses contact with the suspension component, thus closing the valve. Alternatively, the valve may be electronically activated based on a signal from a pressure transducer in the air bags and/or contact switches operated according to trailer height. The pressure in the air bags may indicate trailer load weight.

In this embodiment, the regulator 214 may be an electronic pressure regulator that uses servo or solenoid valve mechanisms to automatically increase or decrease air pressure based on a signal from a processor. When the air bag pressure crosses a certain threshold, indicating a certain trailer weight, an air pressure sensor in the air bags may send a signal to a processor. The processor may send a corresponding signal to the regulator 214 to increase or decrease the pressure threshold, thus allowing air to pass through the regulator to add air to or release air from the tires, as the case may be, until the air bag pressure re-crosses the threshold. In other words, to meet the pressure threshold, the tire management system 300 may inflate or deflate the tires. Generally, if the air bags deflate to accommodate a lighter load, then air may be released from the tires to reduce tire pressure. Likewise, if the air bags inflate to accommodate a heavier load, then air may be added to the tires to increase tire pressure. In some embodiments, a microprocessor may be used to set various pressure thresholds for the regulator 214 based on trailer load so as to allow the tire pressure to be adjusted based on trailer load. Thus, the regulator 214 or pressure thresholds may be set or automatically adjusted based on the trailer load, and air may be added to the tires at an increased pressure to accommodate heavier loads.

In some embodiments, the load may be determined by sensing the pressure in the air bags. An algorithm or data table may be used to determine a load specific tire pressure. The air bag pressure sensor may send a bag pressure signal to a processor. The processor may calculate a load specific tire pressure. A pressure sensor in fluid communication with the air in the tires may sense the tire pressure and send a signal corresponding to the tire pressure to the processor. The processor may compare the load specific tire pressure with the tire pressure. If the tire pressure is above the load specific tire pressure, air may be released from the tire. However, if the tire pressure is below the load specific tire pressure, air may be added to the tire by the tire inflation system. In some embodiments, air may be added to the tire through an electronic pressure regulator, such as the QPV Series regulators by Equilibar (Fletcher, N.C.), or system of solenoid valves in fluid communication with the air pressure supply 114 and the tires. In some embodiments, air may be released from the tires by one or more electronically-actuated pressure release valves.

Figure 4:
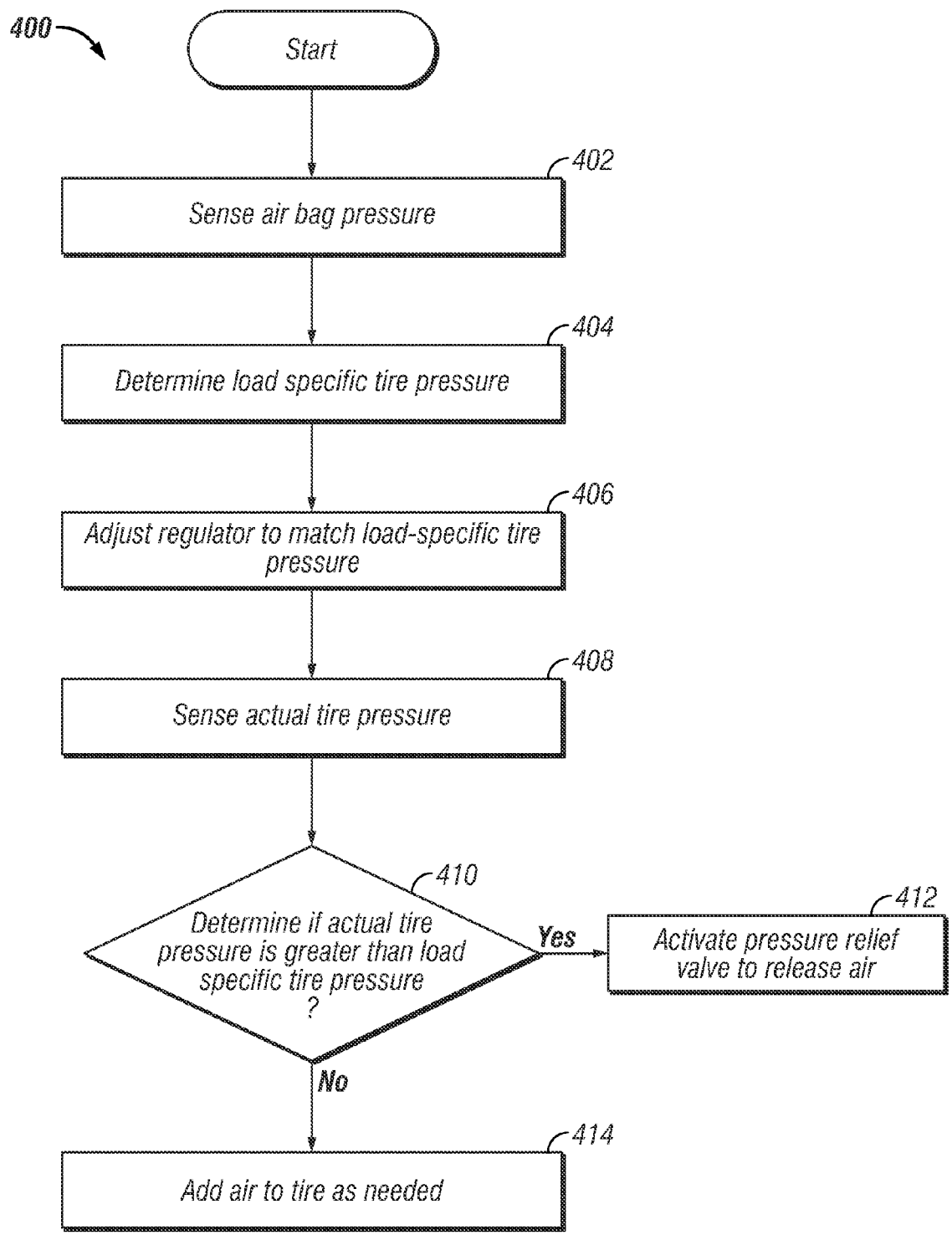
FIG. 4 illustrates a flowchart of an embodiment of a process for pressurizing a tire based on air bag pressure in the tire management system of FIG. 3.

FIG. 4 shows one embodiment of a method 400 for adjusting tire pressure based on trailer load. The method may start and the pressure in the air bar may be sensed 402 through the use of, for example, a pressure transducer. The load specific tire pressure may then be determined 404. The regulator may then be adjusted 406 to match the load-specific tire pressure. The pressure may also be sensed 408 in the tire. It may then be determined whether the actual tire pressure is greater than the load specific tire pressure. If the actual tire pressure is greater than the load specific tire pressure, the pressure relief valve my be activated to release air. If the actual tire pressure is not greater than the load specific tire pressure, air may be added to the tire as needed.

For example, the following chart represents the load specific tire pressure which may correspond to loads placed on the 445/50R22.5 X One® XDN®2 LRL tire from Michelin®.

| Load (lbs.) | Load Specific Tire Pressure (psi) |
|---|---|
| 13880 | 75 |
| 14620 | 80 |
| 15360 | 85 |
| 16060 | 90 |
| 16780 | 95 |
| 17480 | 100 |
| 18180 | 105 |
| 18740 | 110 |
| 19560 | 115 |
| 20400 | 120 |

In some embodiments, the processor may receive an air bag pressure signal and may then calculate, based on an algorithm, the approximate load present on the trailer based on the bag pressure. The processor may then use a chart similar to the chart above which may be stored in data tables in associated memory, to calculate the load specific tire pressure which corresponds to the load. The above chart may be generated or approximated by the following exemplary algorithm which may be used to more precisely calculate the load specific tire pressure based on the load:

$$y=0.006757x-18.7838$$

where x equals the load and y equals the load specific tire pressure. Thus, the processor may use an algorithm similar to the previous algorithm to calculate the load specific tire pressure.

Figure 5:
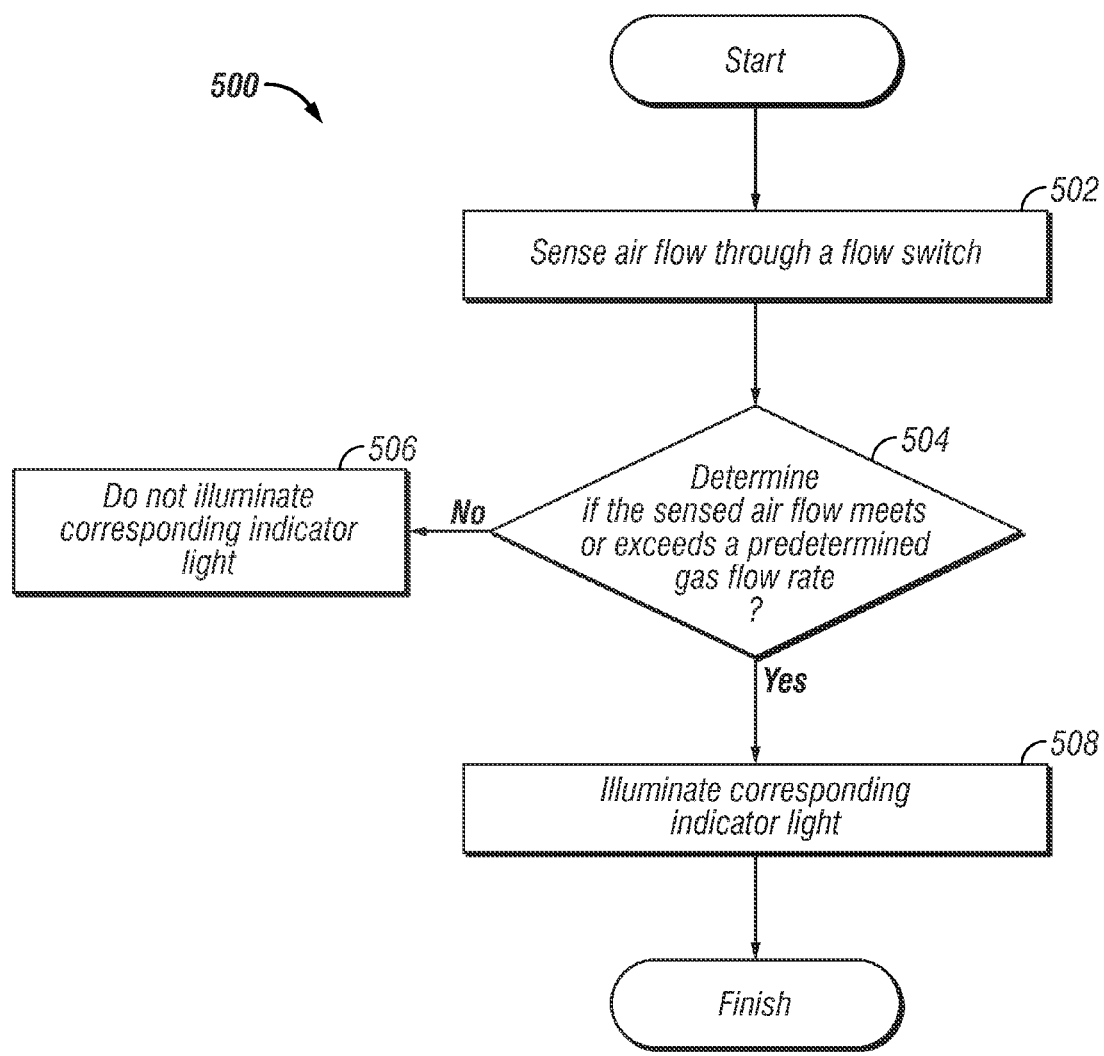
FIG. 5 illustrates a flowchart of an embodiment of a process for lighting an indicator light in the tire management system of FIG. 3.

The control panel 360 may comprise a circuit of conventional electrical components, such as relay, resistors and switches, or may comprise an integrated circuit board and processor programmed to activate indicator lights upon receiving and processing signals from the flow switches 316, 336, 338, 340, 342, 344. For example, as shown in FIG. 5, a method 500 for lighting an indicator light in the tire management system of FIG. 3 may start and air flow through a flow switch may be sensed 502. It may then be determined 504 whether the sensed air flow meets or exceeds a predetermined gas flow rate. If the sensed air flow does not meet or exceed the predetermined gas flow rate, the corresponding indicator light may not be illuminated 506. If the sensed air flow does meet or exceed the predetermined gas flow rate, the corresponding indicator light may be illuminated 508. The method 500 may then end.

The predetermined gas flow rate may be set slightly above the normal gas flow rate expected for normal operation of the system 300. The predetermined gas flow rate may be set by a user and may be set at different flow rates for different switches in system 300. In some embodiments, the predetermined gas flow rate may be determined by a processor and may be changed by the processor.

In one example embodiment, each flow switch 336, 338, 342, 344 may correspond to an indicator light 363, 364, 366, and 368, respectively, which may correspond to a tire 302, 304, 308, 306, respectively. Thus, a user may know which tire is experiencing an increased flow rate by viewing which indicator light 363, 364, 366, 368 is illuminated. One of skill in the art will recognize that the indicator lights may receive signals and may illuminate, turn off, change color, emit an audible sound, or perform some other indicating function to alert the driver.

Each of the indicator lights 362, 364, 366, and 368 may correspond to a reset switch 372, 374, 376, and 378, respectively, which may reset the indicator light 362, 364, 366, 368 after it has been illuminated. Additional reset switches (not shown) may correspond to the low tire pressure light 361 and ThermAlert™ light 358. The process 400 may then end 412.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

What is claimed is:

1. A tire management system for a truck or trailer comprising an axle having a first tire and a second tire mounted thereto, the system comprising,
    an air pressure supply connected to the first tire and to the second tire so as to allow sealed communication of pressurized air between the air pressure supply and the first tire;
    a first pilot-operated check valve in sealed fluid communication with the air pressure supply and with the first tire;
    a second pilot-operated check valve in sealed fluid communication with the air pressure supply and with the second tire;
    the first and second pilot-operated check valves each being configured to allow air to flow only from the air pressure supply to the first tire and the second tire, respectively, when not activated, and to allow air to flow between the first tire and second tire and the air pressure supply to maintain substantially equalized pressures in the first tire and second tire when activated, the first and second pilot-operated check valves being further configured to remain substantially continuously activated while an ignition switch of the truck is activated.

2. The system of claim 1 further comprising a solenoid valve in sealed fluid communication with the air pressure supply, and in sealed fluid communication with a pilot of each the first and second pilot-operated check valves, wherein the pilot of each the first and second pilot-operated check valves is capable of pneumatic activation, and the solenoid valve is configured to allow pressurized air to flow from the air pressure supply to each pilot to activate the pilot when the solenoid valve is activated.

3. The system of claim 2, wherein the solenoid valve is electrically operable, and is connected to the truck ignition and configured to activate when the truck ignition is activated.

4. The system of claim 2, wherein the solenoid valve is pneumatically operable, and is connected to an air brake system of the truck or the trailer, and is configured to activate when the air brake system is pressurized.

5. The system of claim 1, wherein the pilot of each the first and second pilot-operated check valves is capable of electrical activation.

6. The system of claim 1, further comprising:
    a first flow switch situated between and in sealed fluid communication with the first pilot-operated check valve and the first tire, the first flow switch configured to generate a first signal when the air flow through the first flow switch exceeds a predetermined rate;
    a first visual indicator connected to the first flow switch and capable of activation upon receipt of the first signal from the second flow switch;
    a second flow switch situated between and in sealed fluid communication with the second pilot-operated check valve and the second tire, the second flow switch configured to generate a second signal when the air flow through the second flow switch exceeds a predetermined rate; and
    a second visual indicator connected to the second flow switch and capable of activation upon receipt of the second signal from the second flow switch.

7. The system of claim 1, further comprising a regulator situated between and in sealed fluid communication with the air pressure supply and the first and second pilot-operated check valves, the regulator configured to pass pressurized air to the first and second pilot-operated check valves at a pressure setting suitable for maintaining proper air pressure in the first tire and in the second tire, wherein air may flow between the first and second tires and the regulator to substantially equalize the pressures in the first tire and second tire when the pilot of each pilot-operated check valve is activated.

8. The system of claim 7, further comprising:
    a pressure switch in sealed fluid communication with the regulator such that the pressure switch may detect the pressure of air passing through the regulator, the pressure switch configured to generate a signal if the pressure of air passing through the regulator drops below a threshold; and
    a visual indicator connected to the pressure switch and capable of activation upon receipt of the signal.

9. The system of claim 7, wherein the regulator comprises a pressure relief valve configured to release air if the pressure of the air in the first tire or second tire exceeds a threshold.

10. The system of claim 1, further comprising a pressure relief valve in sealed fluid communication with the first tire and configured to release air if the air pressure in the first tire exceeds a threshold.

11. The system of claim 7, further comprising a load sensor configured to generate a signal that indicates the weight of the load sensed by the load sensor, wherein the regulator is configured to automatically adjust the pressure setting based on the signal so as to increase or decrease the pressure of the air that the regulator allows to pass through to the first and second pilot operated check valves.

12. The system of claim 1, further comprising a shut-off valve situated between and in sealed fluid communication with the air supply and the first and second tires.

13. The system of claim 6, wherein the first visual indicator and the second visual indicator are configured to remain activated even if the first flow switch and the second flow switch stop generating the first signal and second signal, respectively; the system further comprising a first reset switch connected to the first visual indicator and capable of deactivating the first visual indicator, and a second reset switch connected to the second visual indicator and capable of deactivating the second visual indicator.

14. The system of claim 1, wherein the first tire is a wide-base tire and the second tire is a wide-base tire.

15. The system of claim 1, further comprising:
- a temperature-actuated pressure barrier mounted adjacent and in a heat-exchange relationship with a wheel-end assembly to which the first tire is mounted, the temperature-actuated pressure barrier being in sealed fluid communication with the air pressure supply and being capable of releasing pressurized air when the temperature of the wheel-end assembly reaches a predetermined temperature; and
- a flow switch situated between and in sealed fluid communication with the temperature-actuated pressure barrier and the air pressure supply, the flow switch configured to generate a signal when the air flow through the flow switch exceeds a predetermined rate; and
- a visual indicator connected to the flow switch and capable of activation upon receipt of the signal.

16. A method of managing tire pressure for a truck or trailer comprising an axle having a first tire and a second tire mounted thereto, the method comprising,
- connecting an air pressure supply to each of the first and second tires so as to allow sealed communication of pressurized air between the air pressure supply and the first and second tires;
- connecting a first pilot-operated check valve to the air pressure supply and to the first tire so as to allow sealed fluid communication with the air pressure supply and with the first tire;
- connecting a second pilot-operated check valve to the air pressure supply and to the second tire so as to allow sealed fluid communication with the air pressure supply and with the second tire;
- each of the pilot-operated check valves being configured to allow air to flow only from the air pressure supply to the first and second tires when not activated, and to allow air to flow between the first and second tires, respectively, and the air pressure supply to maintain substantially equalized pressures in the first tire and second tire when activated, the first and second pilot-operated check valves being further configured to remain substantially continuously activated while an ignition switch of the truck is activated.

17. The method of claim 16 further comprising connecting a solenoid valve to the air pressure supply and to the first and second pilot-operated check valves so as to be in sealed fluid communication with the air pressure supply and in sealed fluid communication with a pilot of each of the first and second pilot-operated check valves, wherein the pilot of each of the first and second pilot-operated check valves is capable of pneumatic activation, and the solenoid valve is configured to allow pressurized air to flow from the air pressure supply to the pilot to activate the pilot when the solenoid valve is activated.

* * * * *